(No Model.) 2 Sheets—Sheet 1.

G. A. J. TELGE.
VALVE GEAR.

No. 552,156. Patented Dec. 31, 1895.

Witnesses.
Walter E. Allen.
Fred R. Proctor.

Inventor.
Georg A. J. Telge.
By Knight Bros.
Attorneys.

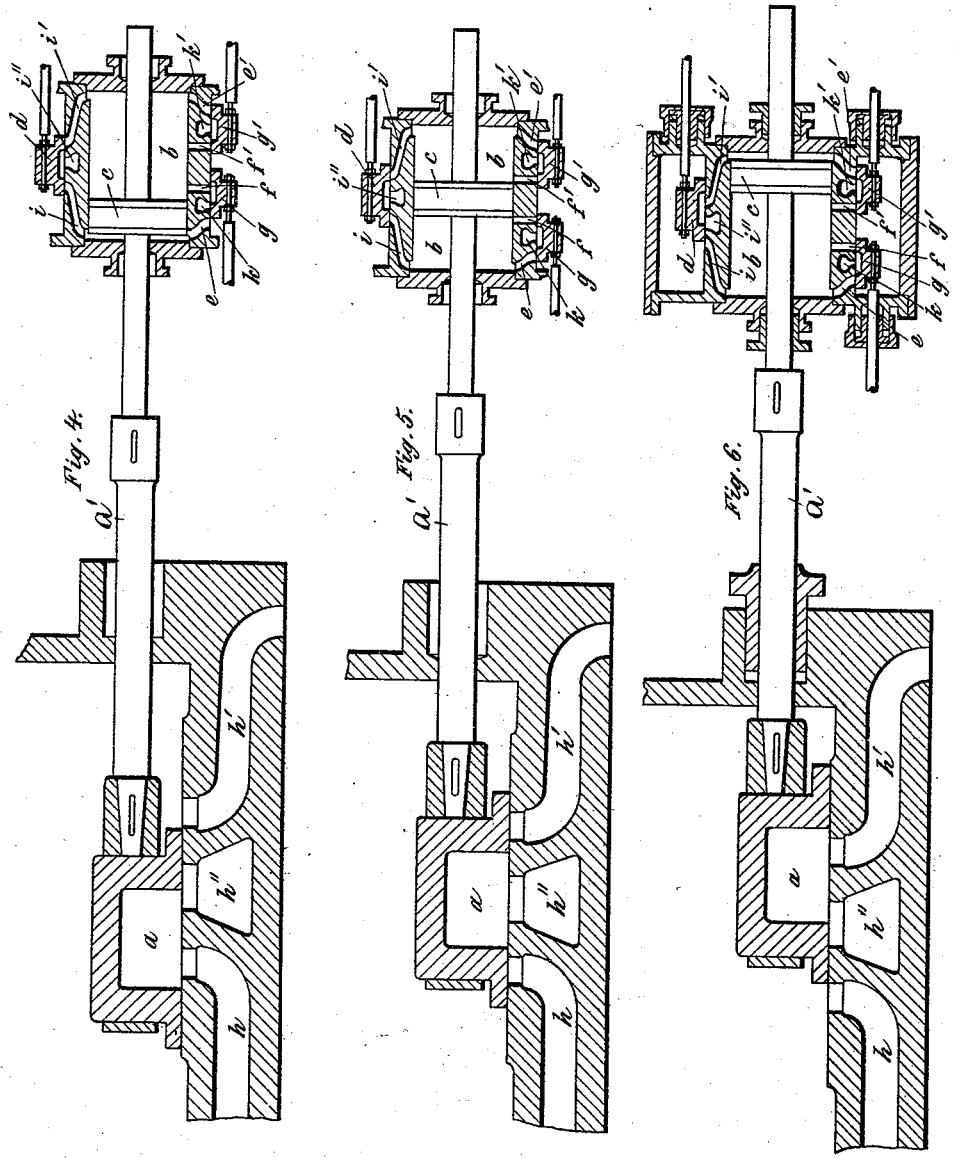

UNITED STATES PATENT OFFICE.

GEORG AUGUST JULIUS TELGE, OF OLDENBURG, GERMANY.

VALVE-GEAR.

SPECIFICATION forming part of Letters Patent No. 552,156, dated December 31, 1895.

Application filed February 21, 1895. Serial No. 539,296. (No model.)

*To all whom it may concern:*

Be it known that I, GEORG AUGUST JULIUS TELGE, engineer, residing at 5ª Sophienstrasse, Oldenburg, Grand Duchy of Oldenburg, in the Empire of Germany, have invented Improvements in Valve-Gear for Steam-Engines; and I do hereby declare that the following is a full, clear, and exact description of the same.

This invention relates to improvements in the valve-motion for steam-engines, especially for marine engines and locomotives, which improved valve-motion permits of producing a variable expansion and reversing by means of one main slide, so that the complicated valve-gears can be dispensed with.

In the accompanying drawings my improved valve-motion is shown in section in Figures 1 to 6, each figure showing the parts in different positions.

$a$ is a slide on the main steam-cylinder, and this slide is connected by a rod $a'$ passing through stuffing-boxes in the slide-casing and the valve-mechanism cylinder $b$ with the piston $c$ in said valve-mechanism cylinder $b$.

The stroke of this piston $c$ is precisely the same as that of the slide $a$. The valve-mechanism cylinder $b$ is provided with two slide-casings, of which the one in which the slide $d$ is mounted is of the usual construction as used in steam-engines, wherein the other slide-casing has two channels $e$ and $e'$ at the ends, in addition to the two channels $f$ and $f'$, which beginning at the slide-surface extend to the cylinder in such a manner that a space is formed between them equal to the thickness of the piston $c$. The channels $e$ and $f$ and $e'$ and $f'$ can be closed by the slides $g$ and $g'$ respectively, which slides may be connected with each other and are operated as is also the slide $d$ in any suitable manner—for example, by means of eccentrics from the main shaft or from a separate shaft in turn operated from the main shaft.

Figure 1:
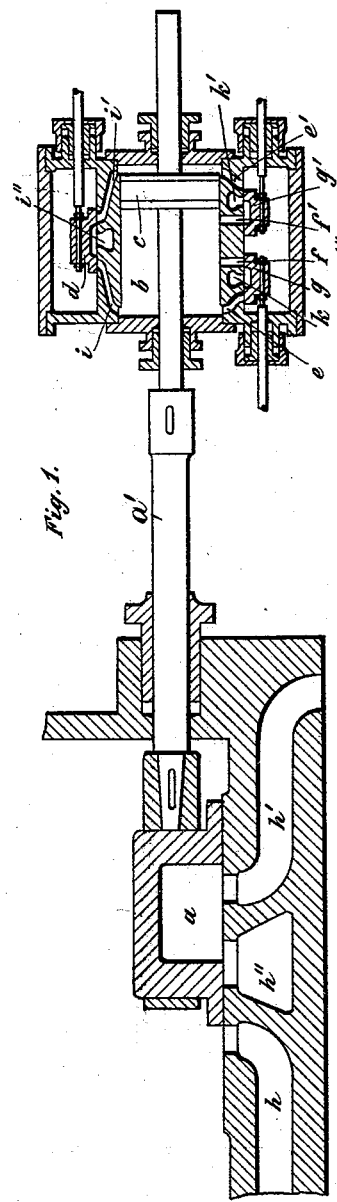
Figure 2:
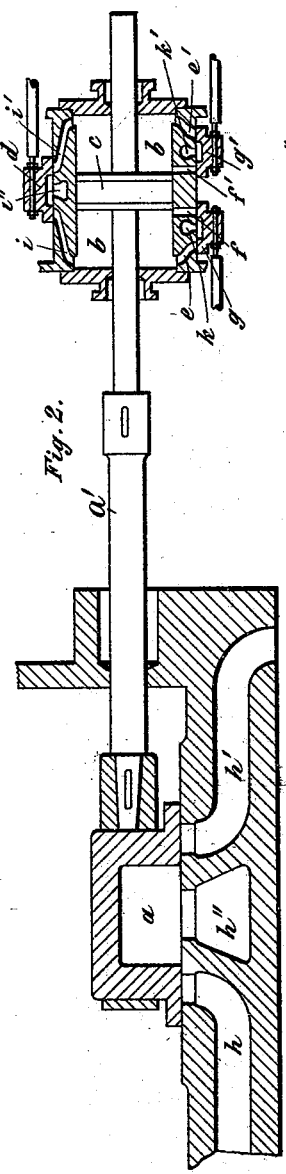
Figure 3:
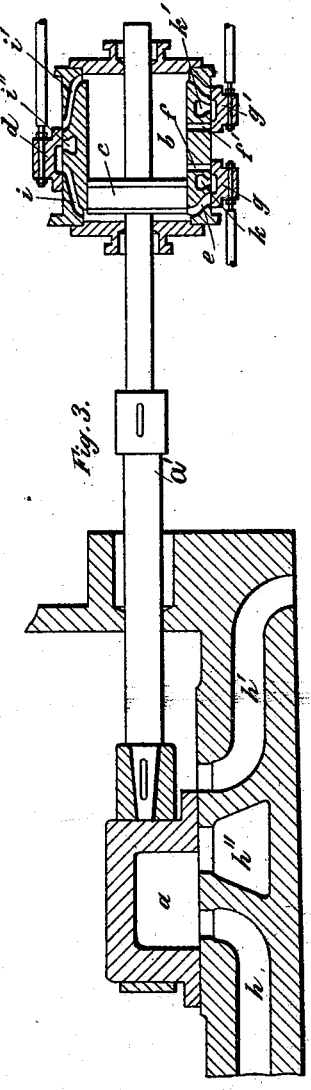

The operation of the valve mechanism is as follows: The slide $d$ is shifted by the crosshead bolt in such a manner that the channel $i$ is opened. (See Fig. 6.) Steam then drives the piston $c$ and the main slide $a$ forward in such a manner that the channel $h$ of the main steam-cylinder is suddenly opened entirely, and at the same time the exhaust-steam at the other side of the piston in the main steam-cylinder can pass off freely through the channel $h'$. If now the slide $d$, under the action of its actuating mechanism, moves to such an extent that it closes the channels $i$, $i'$ and $i''$, and the slide $g'$ opens the channel $e'$ and the slide $g$ closes the channels $e$, $f$ and $k$, (see Fig. 1,) the steam forces the piston $c$ to the left. After the latter, during this movement, has passed the channel $f'$ the exhaust-steam escapes, as the above-mentioned position of the slide $g'$ presents the channel $f'$ in communication with the exhaust-channel $k'$ through the cavity in the slide, and the pressure on piston $c$ stops. As the channels $i$, $i'$ and $i''$ and $e$, $f$ and $k$ are all closed, the piston $c$ can move no farther and stops at the center of the valve-cylinder $b$, between the ports $f$ and $f'$, if the size of the valve-mechanism cylinder is in the proper relation to the friction of the slide of the main steam-cylinder, the friction in the stuffing-boxes and the friction of the piston $c$. The slide $a$ now closes the channels $h$, $h'$ and $h''$ of the main steam-cylinder and the expansion begins. (See Fig. 2.) Shortly after the piston $c$ in the valve-cylinder has arrived at the central position and the steam that has driven it into this position has escaped, the slide $g'$ again closes all the channels $e'$, $f'$ and $k'$, so that the parts are brought into the positions shown in Fig. 2. Thereupon the slide $d$ opens the channel $i'$ and connects the channel $i$ with the exhaust-channel $i''$, so that the piston $c$, and with it the slide $a$ of the main steam-cylinder, are brought into their extreme left-hand positions, as shown in Fig. 3, and thereby the slide $a$ opens the channel $h'$ and connects the channel $h$ with the exhaust-channel $h''$ of the main steam-cylinder. The slide $d$ again closes all the channels $i$, $i'$ and $i''$, whereas the slide $g$ opens the channel $e$, as shown in Fig. 4, so that the steam will force the piston $c$ to the right. As shown in Fig. 5 the piston $c$ again remains at the center of the cylinder as the steam that has forced it escapes when the piston has passed the channel $f$, which is connected by the recess in the slide with the exhaust-channel $k$. The slide $a$ again closes all the channels $h$, $h'$ and $h''$, so that the steam again expands in the main steam-cylinder. The slide $g$ then closes all the channels $e$, $f$ and $k$, whereas the slide $d$ opens the channel $i$ and connects the channel $i'$ with the exhaust-channel $i''$ in that the piston $c$ and with it the slide $a$ are brought into their extreme right-hand position, as shown in Fig. 6. The slide $a$ again opens the channel $h$ and connects the channel $h'$ with the exhaust-channel $h''$. Thereupon the above motions are repeated, the slide $d$ closing all the channels $i$, $i'$ and $i''$, and the slide $g'$ opening the channel $e'$.

It is evident that by differently adjusting the actuating part of one or the other of the two slides $g$ and $g'$ a different expansion can be produced at any time. At each rotation of the main shaft the main slide is opened at once for a full admission of steam and also for the escape of steam. Thus the reversing-gears for marine engines and locomotives can be dispensed with, as my improved valve-gear works equally as well for rotation in either direction and thus can be applied with great facility on such engines.

This valve-gear is adapted for use with all kinds of valve and slide-controlling mechanism, as by means of the same all expansion-valve mechanism can be dispensed with.

I claim—

In a valve motion for steam engines, the combination of the main slide $a$, of the main steam cylinder, the valve cylinder $b$, the valve piston $c$ working in cylinder $b$ and connected with slide $a$ through a suitable rod, channels $i$, $i'$ and $i''$ on one side of cylinder $b$, slide valve $d$ controlling said channels, the channels $e$, $e'$, $f$, $f'$, $k$, and $k'$ on the other side of said cylinder $b$, slide valves $g$, $g'$ controlling said channels, and suitable operating mechanism, substantially as and for the purpose set forth.

In witness whereof I have hereunto set my hand in presence of two witnesses.

GEORG AUGUST JULIUS TELGE.

Witnesses:
F. H. HOYER,
WILH. KRÄMER.